United States Patent [19]
Saunders et al.

[11] Patent Number: 6,049,566
[45] Date of Patent: Apr. 11, 2000

[54] HIGH EFFICIENCY SIGNALING WITH MINIMUM SPACECRAFT HARDWARE

[75] Inventors: Oliver W. Saunders, Los Angeles; Jean A. Develet, Jr., Rancho Palos Verdes; Eric R. Wiswell, Torrance, all of Calif.

[73] Assignee: TRW Inc., Redondo Beach, Calif.

[21] Appl. No.: 08/900,039

[22] Filed: Jul. 24, 1997

[51] Int. Cl.$^7$ .............................. H04B 1/38; H04B 7/216; H04B 7/185; H04L 23/00

[52] U.S. Cl. .......................... 375/220; 375/219; 375/377; 375/200; 370/320; 455/12.1

[58] Field of Search ..................... 375/211, 377, 375/200, 206, 220, 219; 370/320, 316, 323, 325; 455/12.1, 13.3, 427, 3.2; 342/352, 353

[56] References Cited

U.S. PATENT DOCUMENTS

| | | | |
|---|---|---|---|
| 4,901,307 | 2/1990 | Gilhousen et al. | 370/320 |
| 5,473,601 | 12/1995 | Rosen et al. | 455/12.1 |
| 5,805,579 | 9/1998 | Erving et al. | 370/320 |

*Primary Examiner*—Stephen Chin
*Assistant Examiner*—Betsy L. Deppe
*Attorney, Agent, or Firm*—Michael S. Yatsko

[57] ABSTRACT

A method is disclosed for efficiently transmitting large numbers of data channels through a satellite (24). The method uses a block encoder (28) that encodes the data channels with a block code to produce an encoded uplink data stream. A modulator (30) modulates the encoded uplink data stream. A transmit antenna (32) then sends the resultant modulated uplink data stream (34) to the satellite (24). The satellite uses a satellite demodulator (48) and a switch (50) to produce an internal data stream consisting of selected data channels in the uplink data stream (34). The internal data stream is fed into a convolutional encoder (52). The output of the convolutional encoder (52) is connected to a satellite modulator (54). The satellite transmit antenna (56) then sends the resultant modulated downlink data stream (58) to a receiver.

20 Claims, 2 Drawing Sheets

HIGH EFFICIENCY SIGNALING WITH MINIMUM SPACECRAFT HARDWARE

BACKGROUND OF THE INVENTION

The present invention relates to communications networks that include satellite links. More specifically, the invention relates to a method that allows a communications satellite to substantially increase the number of information channels it can process without a corresponding increase in spacecraft hardware, weight, or power.

Modern communications networks carry staggering amounts of information, typically divided for transmission purposes into individual data channels. Whether the data channels carried by the communications network have their origin in the telephone system, television stations, or other source, these data channels are often combined into a single data stream. One common link in the communications network handling the data stream is a communications satellite.

A single satellite may have, for example, 30 or 40 uplink transponders (essentially receive antennae), each able to accept a data stream with a bandwidth of 250 MHz. The resultant uplink data path would then have a capacity of 8 to 10 gigabits per second. Where a satellite is a link in the communications network, Customer Premises Equipment (CPE) may combine the data channels into a single data stream, as well as encode, modulate, and transmit the uplink data stream to the satellite.

Because the uplink data stream sent to the satellite is susceptible to numerous sources of interference that can corrupt the uplink data stream, the CPE encodes the data stream with error protection codes. The first code the CPE applies is typically a block code. The block code essentially adds parity bits to each predefined number of bits in a data channel(a block). The block encoded data channels are then further encoded with a convolutional code to reduce the bit error rate (BER) to a tolerable level (BER is the ratio of incorrectly received bits to the total number of received bits). The sequence of coding described above is often referred to as "concatenated coding".

There are difficulties with concatenated coding, however. By design, the result of the convolutional coding is that the bits in the data channel become scrambled and interleaved among all the other bits in the data channel (including the block code bits). That is, they are no longer in order. As a result, the satellite must convolutionally decode each data channel recovered from the uplink data stream before the bits in each individual data channel can be recovered. The end result is an extremely complicated processing path for data channels in the satellite.

The processing path for the uplink data streams through a typical satellite include stages for receiving, decoding, switching, re-encoding, and transmitting downlink data streams to their destinations. The switching stage separates individual data channels from the uplink data streams and combines them with other data channels to form a composite downlink data stream that will be sent through a downlink antenna. A satellite characteristically uses a convolutional decoder followed by a block decoder to extract each data channel in the uplink data stream. Today, tens of thousands of channels may compete for services in an uplink data stream to be processed by the communications satellite. A single satellite would require enormous amounts of space, weight, and power to convolutionally decode each channel individually.

Increasing the size, weight, and onboard power of a satellite so that it can decode more data channels drives up the cost of the satellite dramatically. Not only does the satellite itself become more expensive because of the additional decoder circuitry and solar panels used to provide onboard power, but it also costs more to launch the satellite because larger rockets using more propellant are required to put the satellite into orbit.

The problem becomes even more significant when the highly complex encoding schemes employed by modern communications techniques are considered. One example of such a technique is Code Division Multiple Access (CDMA). This technique uses sophisticated encoding which generates massive amounts of data for the communication network to carry. CDMA transmissions to a satellite may, for example, divide the 250 MHz transponder bandwidth into smaller bandwidths of approximately 12 MHz, each carrying data channels for dozens of users. In order for the satellite to decode the data channel for each user, the satellite would have to carry hundreds (perhaps thousands) of sets of heavy, complex decoding electronics, and generate enormous amounts of power. Thus, satellite size, weight, and power restrictions prohibit the satellite from handling the large numbers of data channels that modern communications techniques can generate.

Therefore a need is present in the industry for an improved communications network, which overcomes the disadvantages discussed above and previously experienced.

BRIEF SUMMARY OF THE INVENTION

It is an object of the present invention to provide a method of communicating a large number of data channels through a satellite link.

It is a further object of the present invention to enable a satellite to process a large number of data channels without a corresponding increase in the size of the satellite.

It is a further object of the present invention to enable a satellite to process a large number of data channels without a corresponding increase in the power required by the satellite.

It is a further object of the present invention to enable a satellite to process a large number of data channels without a corresponding increase in the weight of the satellite.

It is a further object of the present invention to increase the number of data channels a single satellite may process.

It is a further object of the invention to reduce the complexity of a ground transmitter in a communications system.

The method of the present invention allows large numbers of original data channels combined into an uplink data stream to be transmitted efficiently through a satellite link. The method of the present invention first block encodes the input data channels that form the encoded uplink data stream. The encoded uplink data stream is then modulated with, for example, Quadrature Phase Shift Keying (QPSK), to produce a modulated uplink data stream which is transmitted from the ground to the satellite. Note that multiple ground stations may each produce a modulated uplink data stream.

The satellite demodulates the modulated uplink data received by its numerous transponders to generate a demodulated uplink data stream. Gathering individual data channels from the demodulated uplink data stream, the satellite then generates at least one internal data stream. The internal data stream is convolutionally encoded to produce an encoded downlink data stream. The satellite modulates the encoded downlink data stream for transmission to ground receiver(s).

Upon reception of the downlink data stream, the ground receiver may demodulate the modulated downlink data stream, convolutionally decode, then block decode the resulting encoded downlink data stream. The results of the block decoding just described are reproductions of the individual input data channels present in the downlink data stream.

DETAILED DESCRIPTION OF THE INVENTION

Figure 1:
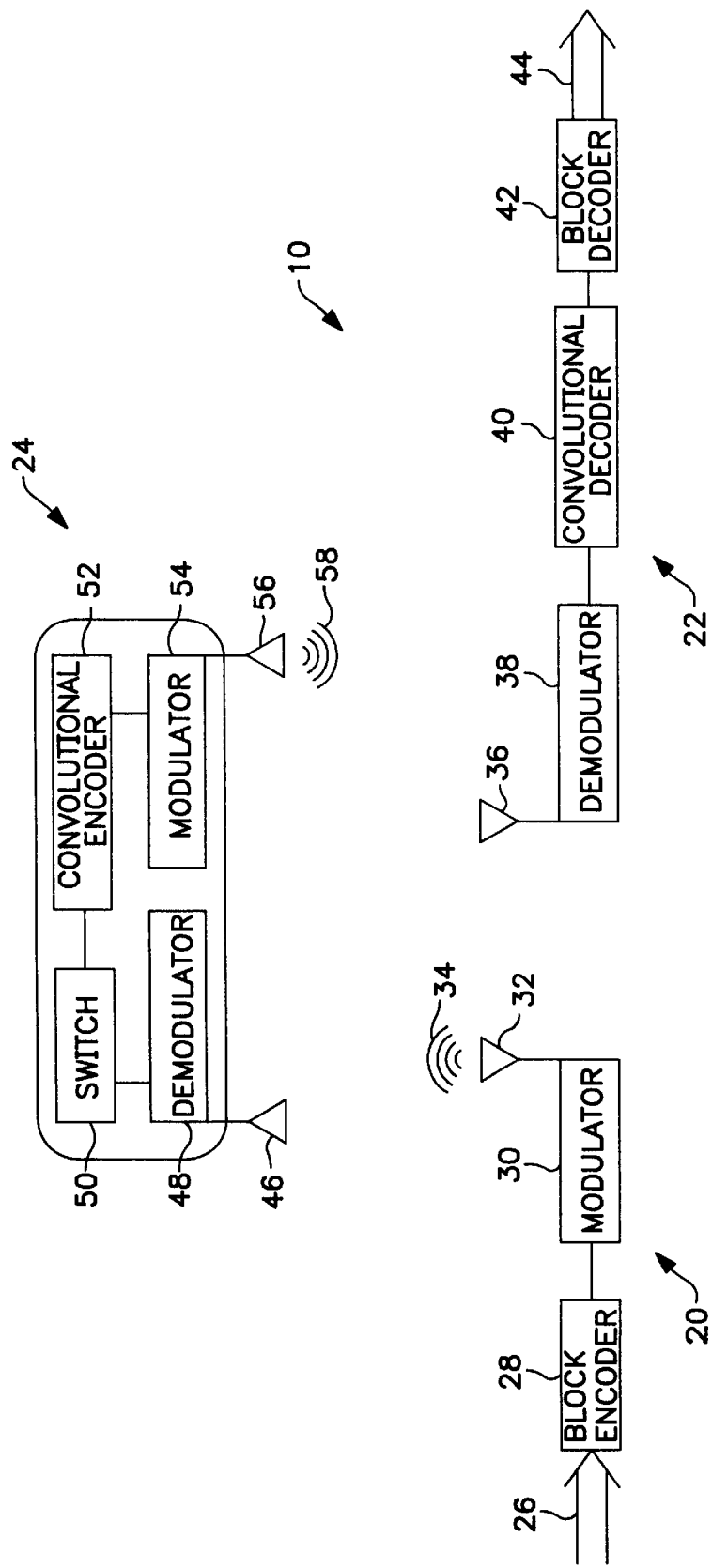
FIG. 1 shows a block diagram of customer premises equipment and a satellite cooperating in a communications network.

Turning now to FIG. 1, a block diagram of a communications network 10 is shown. The communications network 10 includes customer premises equipment (CPE) transmitter 20, CPE receiver 22, and a satellite 24.

The CPE transmitter 20 includes a data input 26, which carries the input data channels that will be transmitted through the satellite 24. A block encoder 28 is connected to the data input 26. The output of the block encoder 28 is connected to the CPE modulator 30. The CPE modulator 30 drives the CPE transmit antenna 32 to produce the modulated uplink data stream 34.

The CPE receiver 22 includes a CPE receive antenna 36 connected to a CPE demodulator 38. The output of the CPE demodulator 38 is connected to a convolutional decoder 40, which, in turn, is connected to a CPE block decoder 42. The data output 44 of the CPE block decoder 42 carries decoded output data channels that are reproductions of the input data channels carried on data input 26.

The satellite 24 includes a satellite receive antenna 46 which is connected to a satellite demodulator 48. The output of the satellite demodulator 48 is connected to a switch 50, which, in turn, is connected to a convolutional encoder 52. The convolutional encoder 52 feeds a satellite modulator 54 which drives the satellite transmit antenna 56 to produce the downlink data stream 58.

Still with reference to FIG. 1, the operation of the CPE transmitter is described next. The data input 26 connects input data channels to a block encoder 28 in the CPE transmitter 20. The input data channels may have been generated by virtually any number of sources including, for example, the telephone system, television stations, and Internet links.

The block encoder 28 generates an encoded uplink data stream by coding the input data channels with a code chosen from a category of codes called block codes. Block codes add parity bits to the data in the input data channels according to a predetermined mapping between input bits and associated parity sequences. In a preferred embodiment, the block code may be a Reed-Solomon code.

In general, a block code appends the coded data with parity bits, but otherwise leaves the data unchanged. Codes with the property of distinct data bits and parity bits are termed "systematic". Note that convolutional encoding is not applied to the individual data channels, as is typically the case in satellite communications. By comparison, systematic implementations of convolutional encoders are not generally employed. Thus the bits that appear at the output of the convolutional encoder cannot be uniquely identified as data or parity bits.

In addition, when convolutional and block codes are concatenated, it is standard practice to add an interleaver at the input of the convolutional encoder and a de-interleaver at the output of the convolutional decoder. This interleaver reorders the block coded bits before they are convolutionally encoded. A corresponding de-interleaver restores the order of the bits output by the convolutional (Viterbi) decoder before block decoding. The interleaving process enhances the joint performance of the two codes.

Thus, the satellite 24 may recover the bits in the input data channels without complicated convolutional decoding hardware. In particular, the input data channels are often divided into frames of a predetermined bit length. Because the CPE transmitter 20 does not apply convolutional coding to the input data channels, the satellite may recover and process the frames without heavy, expensive, and power consuming convolutional decoding hardware used to reconstruct the original bit pattern in the frames in each input data channel. Furthermore, the CPE transmitter 20 benefits from simplified design, lower cost, and higher reliability by eliminating the convolutional encoders.

The encoded uplink data stream is fed into a CPE modulator 30. In preparation for uplink transmission, the CPE modulator generates a modulated uplink data stream by applying an efficient transmission modulation to the encoded uplink data stream. Among the many suitable modulation schemes that the CPE modulator 30 may use are Quadrature Phase Shift Keying (QPSK) and Binary Phase Shift Keying (BPSK). Subsequently, a power amplifier (not shown), typically applies the modulated uplink data stream to the CPE transmit antenna 32 to produce an uplink data stream 34. The uplink data stream 34 is simply an electromagnetic wave realization of the modulated uplink data stream that may be received by the satellite 24.

Convolutional encoding has previously been used to help maintain the integrity of the input data channels in the uplink data stream 34 by adding error protection and correction capabilities. The CPE transmitter 20, however, may satisfactorily communicate the uplink data stream 34 to the satellite 24 without convolutional encoding. One possible method of accomplishing satisfactory communication is to increase the signal strength of the CPE transmit antenna 32. By increasing the signal strength, the average bit energy present in the uplink data stream 34, Eb, is increased. Compared to the average level of the background noise, No, a transmit power that increases Eb/No to approximately 10 decibels (db) is typically sufficient to allow the uplink data stream to reach the satellite 24 with an equivalent BER of less than $10^{-10}$. Note that the CPE transmitter 20 generally is not faced with a shortage of power unlike the satellite 24.

The satellite 24 processes the uplink data stream 34 received at the satellite receive antenna 46. The satellite demodulator 48 generates a demodulated uplink data stream by removing the modulation from the uplink data stream 34. Thus, the satellite demodulator 48 produces output data on which the only encoding is block encoding (the result of the block encoder 28). The demodulation process may be accomplished using a simple hard-decision technique.

A hard-decision technique limits itself to deciding whether, at any predetermined time, a signal is a "1" or a "0". Block encoding schemes generally retain their integrity very well under hard-decision techniques, thereby making a hard-decision demodulator in the satellite 24 an attractive choice. A soft-decision technique, on the other hand, requires hardware to quantize each point of interest in the input signal and assign a value to that point representing the probability that the point is a "1" or a "0".

Note that no convolutional decoding is necessary to reproduce the bit patterns in the input data channels for processing, since the CPE transmitter 20 did not apply convolutional encoding on the ground. Conventional networks do typically add convolutional coding, however, and a satellite in a conventional network would therefore potentially need a convolutional decoder for each input data channel in each uplink data stream. Thus, the elimination of convolutional decoders in the satellite 24 translates into tremendous savings in weight, power, and space, particularly when the number of input data channels begins to grow. Note also that the satellite 24 does not block decode the uplink data stream.

The data output of the satellite demodulator 48 is connected to the switch 50. The switch 50 combines input data channels (still block encoded) recovered by the satellite demodulator 48 into an internal data stream. The internal data stream may consist, for example, only of input data channels of a predetermined type, destination, or other characteristic. The switch 50 may also produce an internal data stream from demodulated uplink data streams provided by more than one satellite receive antenna 46, as will be explained below in conjunction with FIG. 2.

The internal data stream is connected to a convolutional encoder 52. As noted above, the input to the convolutional encoder typically includes an interleaver. The convolutional encoder 52 generates an encoded downlink data stream. In the process, the interleaver changes the time order of the data being encoded. The convolutional encoder 52 transforms the input data into an encoded stream. Thus, the data channels are not immediately recoverable without a suitable convolutional decoding and de-interleaving process. The convolutional decoder may employ the Viterbi decoding algorithm.

The encoded downlink data stream is subsequently fed into the satellite modulator 54. Like the CPE modulator 30, the satellite modulator 54 may use one of many modulation schemes, including QPSK or BPSK. The resultant modulated downlink data stream is applied to the satellite transmit antenna 56, which produces the downlink data stream 58. Note that the satellite 24 has enhanced the error protection and correction capabilities of the downlink data stream 58 with a convolutional code. As a result, the satellite 24 can rely on a downlink data stream that is substantially less powerful than the uplink data stream to communicate the downlink data to the ground with a satisfactory BER. For example, an Eb/No of 6 db is typically sufficient (approximately 40% as strong as the uplink data stream described above).

At the CPE receiver 22, the downlink data stream 58 is received on the CPE receive antenna 36. The received signal is connected to a CPE demodulator 38, which restores the downlink data stream 58 to the form it was in before the satellite modulator 54 modified it for transmission. The output of the CPE demodulator 38 is therefore a reproduced encoded downlink data stream. Thus, the CPE demodulator 38 output is encoded with a convolutionally encoded block code (the result of the block encoder 28 and the subsequent convolutional encoding by the convolutional encoder 52).

The reproduced encoded downlink data stream passes through a convolutional decoder 40. The convolutional decoder 40 generates a reproduced internal data stream, which, in the absence of transmission errors, is a duplicate of the internal data stream generated by the switch 50. Note that the de-interleaver reorders the bits in the reproduced encoded downlink data stream so that individual input data channels selected by switch 50 and present in the reproduced internal data streams are ready for block decoding.

The CPE block decoder 42 operates on the reproduced internal data stream. In particular, the CPE block decoder removes the original block encoding placed on the individual data channels by the block encoder 28. The result is that the data output 44 contains reproductions of selected input data channels. The data output 44 carries the input data channels selected by the switch 50 and transmitted to the CPE receiver 22 in the form of the downlink data stream 58.

Note that the above described method allows the satellite to process a large number of input data channels without a corresponding increase in size, weight, or power consumption. These benefits flow directly from the fact that no convolutional decoder is necessary in the satellite 24 to reproduce the input data channels for processing, unlike in a conventional network.

In a conventional network, a satellite would potentially need a convolutional decoder for each input data channel in each uplink data stream. Thus, the elimination of convolutional decoders in the satellite 24 translates into tremendous savings in weight, power, and space.

Figure 2:
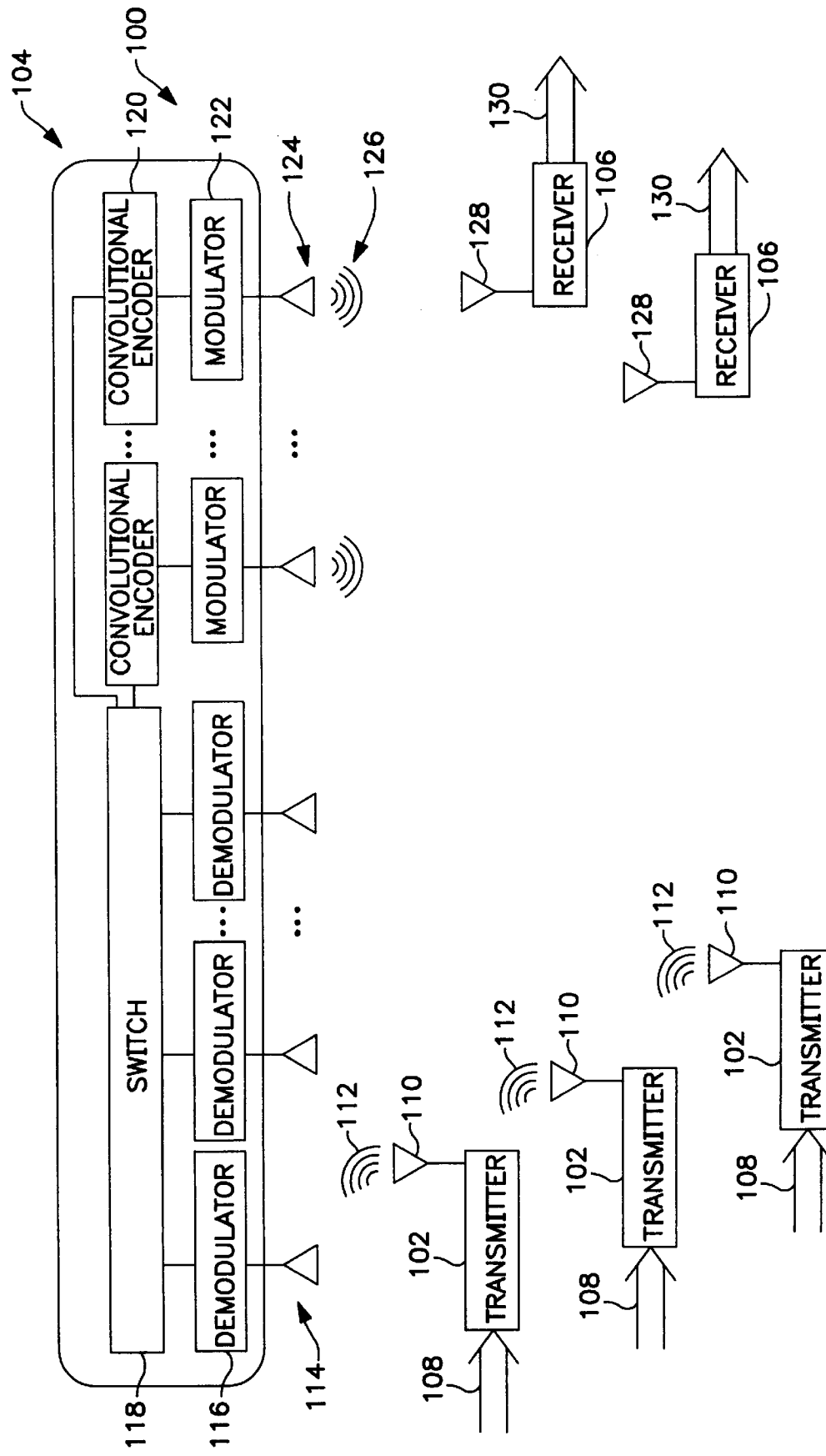
FIG. 2 shows a block diagram of a satellite that is processing uplink data streams sent from multiple network transmitters.

Turning now to FIG. 2, that figure shows a communications network 100 that includes multiple network transmitters 102, a network satellite 104, and multiple network receivers 106.

The individual network transmitters 102 include data inputs 108 and transmit antennae 110, which produce the uplink data streams 112. The network satellite 104 includes a plurality of receive antennae, generally indicated as 114, a plurality of demodulators 116, a switch 118, plurality of a convolutional encoders 120, a plurality of modulators 122, and a plurality of transmit antennae, generally indicated as 124, which produce the downlink data streams, generally indicated as 126.

The network receivers 106 each include a receive antenna 128, and data outputs 130.

The network transmitters 102 may operate as described above with reference to the CPE transmitter 20. That is, the network transmitters 102 may block encode, modulate, and transmit selected input data channels carried by the data inputs 108. Each network transmitter 102 drives its transmit antenna 110 to produce an uplink data stream 112 which propagates to the satellite receiver antenna 114.

When the uplink data streams 112 reach the satellite receive antennae 114, the satellite demodulators 116 remove any modulation applied to the uplink data streams 112 by the transmitters 102. The resulting demodulated outputs are connected to the switch 118.

The switch 118 constructs at least one internal data stream by selectively including input data channels present in any of the uplink data streams 112 (after demodulation by satellite demodulators 116). One internal data stream, for example, may consists only of input data channels destined for a given receiver 106, while another internal data stream may consists of all input data channels to be broadcast to all the receivers 106. The internal data streams are processed next by the convolutional encoders 120.

Error correction information is added to each internal data stream by the convolutional encoders 120. The satellite 104 may include a convolutional encoder 120 for each internal data stream. The outputs of the convolutional encoders 120 are fed into the satellite modulators 122.

The satellite modulators 122 add an efficient transmission modulation to each convolutional encoder 120 output to produce modulated data streams ready for transmission. The modulation, as described above, may be a QPSK or a BPSK modulation. When the transmission modulation has been added, the satellite 104 applies the modulated data streams individually to the satellite transmit antennae 124 to produce the downlink data streams 126.

The downlink data streams 126 travel to the network receivers 106. Each downlink data stream 126 may be destined for only a particular receiver, or, multiple receivers may receive a particular downlink data stream 126 depending on the design of the communications network 100.

Once the downlink data streams 126 reach the network receivers 106, the network receivers 106 operate to produce output data channels carried on data outputs 130. The network receivers 106 may operate as described above with reference to the CPE receivers 22. That is, each of the network receivers 106 may demodulate, convolutionally decode, and block decode the downlink data streams 126. The output data channels 130, therefore, will carry reproduction of the original input data channels present on the data inputs 108. The actual input data channels present on any data output 130 are determined by the switch 118, which may select input data channels from any of the uplink data streams 112 according to any criteria.

The satellite 104 or satellite 24 may include additional signal processing hardware beyond that described above. For example, the satellite 24 or satellite 104 may include hardware to despread received CDMA signals and extract the individual channels in the CDMA signals. The individual channels could then be demodulated, if necessary, and connected to the switch 118 or switch 50 for inclusion in the downlink data streams 126 or 58. While particular elements, embodiments and applications of the present invention have been shown and described, it will be understood, of course that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for communicating input data channels through a satellite, the method comprising:
    (a) block encoding input data channels to produce a block encoded uplink data stream;
    (b) modulating said block encoded uplink data stream to produce a modulated uplink data stream;
    (c) transmitting said modulated uplink data stream to a satellite;
    (d) demodulating said modulated uplink data stream in said satellite to produce a recovered block encoded uplink data stream;
    (e) convolutionally encoding in said satellite said recovered block encoded uplink data stream without decoding the recovered block encoded uplink data stream to produce a concatenated coded downlink data stream;
    (f) modulating said concatenated coded downlink data stream to produce a modulated downlink data stream;
    (g) transmitting said modulated downlink data stream to a receiver.

2. The method of claim 1, further comprising the steps of:
    (h) demodulating said modulated downlink data stream in said receiver to generate a reproduced concatenated coded downlink data stream;
    (i) convolutionally decoding said reproduced concatenated coded downlink data stream in said receiver to generate a reproduced recovered block encoded uplink data stream;
    (j) block decoding said reproduced recovered block encoded uplink data stream in said receiver to produce output data channels.

3. The method of claim 1, wherein the modulation of step (b) is QPSK.

4. The method of claim 1, wherein the modulation of step (f) is QPSK.

5. The method of claim 1, wherein the modulation of step (b) is BPSK.

6. The method of claim 1, wherein the modulation of step (f) is BPSK.

7. The method of claim 1, wherein the demodulation of step (d) uses a hard-decision technique.

8. The method of claim 1, wherein the block encoding of step (a) uses a Reed-Solomon code.

9. The method of claim 2, wherein the convolutional decoding of step (i) uses a Viterbi decoder.

10. The method of claim 1 wherein the modulation of steps (b) and (f) comprises CDMA modulation and wherein the demodulation of step (d) comprises CDMA demodulation.

11. A method for communicating input data channels through a satellite, the method comprising:
    (a) block encoding input data channels to produce a plurality of block encoded uplink data streams;
    (b) modulating said plurality of block encoded uplink data streams to produce a plurality of modulated uplink data streams;
    (c) transmitting said plurality of modulated uplink data streams to said satellite;
    (d) demodulating said plurality of modulated uplink data streams in said satellite to produce at least one recovered block encoded uplink data stream;
    (e) switching said at least one recovered block encoded uplink data stream to a plurality of internal data streams, each of said plurality of internal data streams associated with an individual convolutional encoder;
    (f) convolutionally encoding each of said plurality of internal data streams without block decoding said recovered block encoded uplink data stream in said satellite to produce a plurality of concatenated coded downlink data streams;
    (g) modulating each of said plurality of concatenated coded downlink data streams to produce a plurality of modulated downlink data streams;
    (h) transmitting each of said plurality of modulated downlink data streams.

12. The method of claim 11, further comprising the steps of:
    (i) demodulating at least one of said plurality of modulated downlink data streams in a receiver to generate a recovered concatenated coded downlink data stream;
    (j) convolutionally decoding said recovered concatenated coded downlink data stream in said receiver to generate a recovered internal data stream;
    (k) block decoding said recovered internal data stream in said receiver to produce output data channels.

13. The method of claim 11, wherein the modulation of step (b) is QPSK.

14. The method of claim 11, wherein the modulation of step (g) is QPSK.

15. The method of claim 11, wherein the modulation of step (b) is BPSK.

16. The method of claim 11, wherein the modulation of step (g) is BPSK.

17. The method of claim 11, wherein the demodulation of step (d) uses a hard-decision technique.

18. The method of claim 11, wherein the block encoding of step (a) uses a Reed-Solomon code.

19. The method of claim 12, wherein the convolutional decoding of step (j) uses a Viterbi decoder.

20. The method of claim 11, wherein the modulation of steps (b) and (f) comprises CDMA modulation and wherein the demodulation of step (d) comprises CDMA demodulation.

* * * * *